United States Patent [19]
Hunt

[11] 3,859,213
[45] Jan. 7, 1975

[54] FILTERING APPARATUS AND METHODS

[75] Inventor: Howard C. Hunt, Hollis, N.H.

[73] Assignee: Improved Machinery, Inc., Nashua, N.H.

[22] Filed: Aug. 17, 1973

[21] Appl. No.: 389,366

[52] U.S. Cl.................... 210/73, 210/75, 210/193, 210/401, 210/404
[51] Int. Cl........................................... B01d 37/02
[58] Field of Search ......... 210/73, 75, 77, 193, 216, 210/217, 400, 401, 402, 404; 426/495

[56] References Cited
UNITED STATES PATENTS

| | | | |
|---|---|---|---|
| 1,922,730 | 8/1933 | Gore et al. | 426/495 X |
| 2,403,021 | 7/1946 | Peterson et al. | 210/75 |
| 2,598,606 | 5/1952 | Robison, Jr. | 210/404 X |
| 2,899,068 | 8/1959 | King et al. | 210/404 X |
| 3,310,174 | 3/1967 | Hornbostel | 210/401 X |
| 3,362,539 | 1/1968 | Takahashi | 210/217 |
| 3,425,802 | 2/1969 | Booth | 210/73 X |

FOREIGN PATENTS OR APPLICATIONS

794,353  4/1958  Great Britain ........................ 210/75

Primary Examiner—Frank A. Spear, Jr.
Assistant Examiner—Robert G. Mukai
Attorney, Agent, or Firm—Robert R. Paquin

[57] ABSTRACT

Apparatus and methods particularly suited for the filtration of difficult-to-filter slurries such as waste slurries, wherein a filtering material (for example, diatomaceous earth) is normally continuously accumulated on successive portions of the driven filtering means of a filter and, after use as a filter medium, removed therefrom together with its retained fraction of the slurry being filtered. As disclosed, the employed filtering material is a separated component of the slurry; and the employed filter is a rotary drum filter having a traveling belt-type filtering means.

5 Claims, 4 Drawing Figures

PATENTED JAN 7 1975 3,859,213
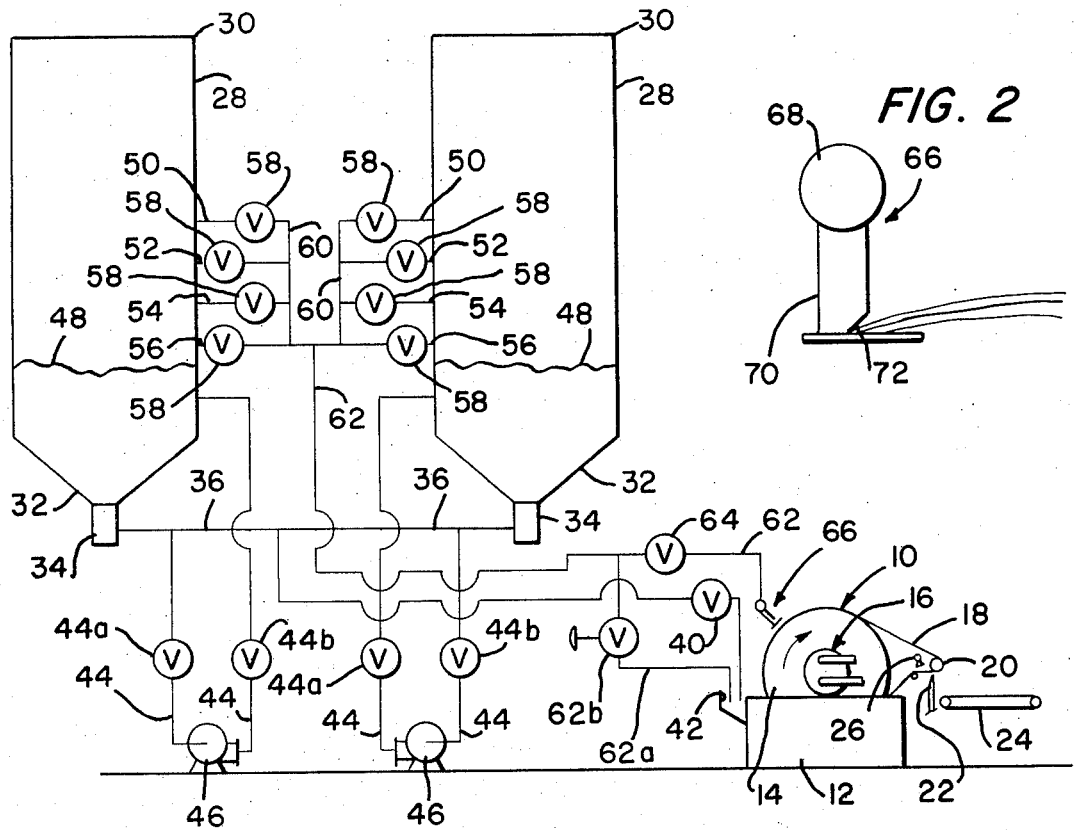
FIG. 1
FIG. 2
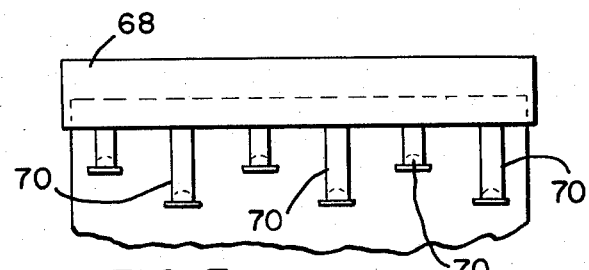
FIG. 3
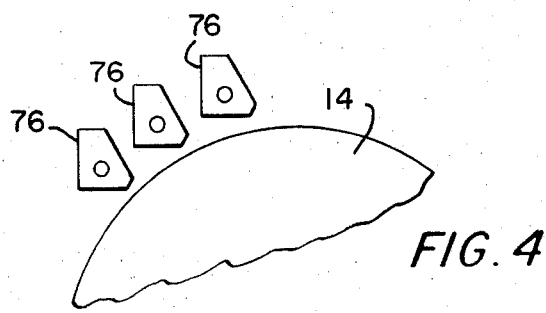
FIG. 4
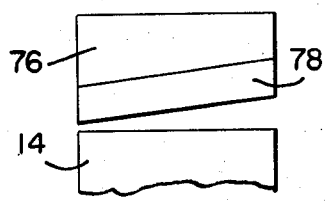
FIG. 5

FILTERING APPARATUS AND METHODS

The present invention relates generally to filtering apparatus and methods and more specifically to filtering apparatus and methods particularly suited for the filtration of difficult-to filter materials such as waste slurries and, by way of even more specific example only, brewery waste slurries, food processing waste slurries, and refinery and other oily waste slurries.

Conventionally, difficult-to-filter waste slurries sometimes have been filtered by means of a thick layer (for example, a layer of about 4 to 6 inches thickness) of filtering means of a rotary drum vacuum filter. In such instances, the vat containing the filter drum has been temporarily filled with the diatomaceous earth or other employed filtering material, the filter operated to accumulate the beforementioned thick layer of filtering material on the filtering means, and the vat then emptied of the remaining filtering material. Thereafter, the vat has been filled with the waste slurry to be filtered and the filter operated while the outer layer of the filtering material and its collected fraction of the waste slurry are scraped from the filtering means by a self-advancing doctor knife. After all or most of the filtering material has been removed by the doctor-knife, the vat has been emptied of any remaining waste slurry and the filter cleaned; and, after such cleaning, the vat has been refilled with filtering material for re-formation of the thick covering of filtering material on the filtering means and subsequent repetition of the beforedescribed process.

From the preceding brief description, it will be seen that the described conventional arrangement undesirably provides essentially a batch process and, at least in the early stages of each cycle of repetition, inherently requires that an undesirably high vacuum be maintained due to the employed thick covering of filtering material. Also, in such prior conventional arrangement, difficulties have been encountered in the operation of the necessary self-advancing doctor-knife; and cleaning of the filtering means without stopping the filtering operation is, of course, impossible in said conventional arrangement.

An object of the present invention is to provide new and improved filtering apparatus and methods particularly suited for the filtration of difficult-to-filter material, such as for example the beforementioned waste slurries, in continuous, rather than batch, operation.

Another object of the invention is to provide new and improved filtering apparatus and methods of the type set forth, which are particularly adapted to be relatively efficient and economical in operation.

Another object is to provide new and improved filtering apparatus and methods of the type set forth, which are particularly adapted for operation at a substantially lower vacuum than normally possible with the beforedescribed prior arrangement.

Another object is to provide new and improved filtering apparatus and methods of the type set forth, which are particularly adapted to permit cleaning of the filtering means during the filter means during the filter operation.

Another object is to provide new and improved filtering apparatus and methods of the type set forth, which are particularly adapted to avoid any necessity for a self-advancing doctor-knife for removal of the filtering material from the filtering means.

Other objects and advantages of the invention will become apparent from the following description taken in collection with the accompanying drawings wherein, as will be understood, the preferred forms of the invention have been given by way of illustration only.

In accordance with the invention, a filtering apparatus may comprise vat means, a rotary filter in the vat means, such filter including filtering means movably driven during operation of the filter and being operable to cause material in the vat means to be collected on successive portions of the filtering means during such filter operation, first supply means operatively associated with the vat means for supplying filtering material thereto and for normally maintaining the vat means sufficiently filled with such filtering material that operation of the filter will cause a covering thereof to be normally continuously accumulated on successive portions of the filtering means, second supply means for supplying material-to-be-filtered to successive portions of the movably driven filtering means and to accumulated filtering material thereon independently of filtering material in the vat means, whereby such accumulated filtering material separates such supplied material into a fraction passing through the accumulated filtering material and a fraction collected thereby, and discharge means operatively associated with the filtering means for discharging accumulated filtering material and its said collected fraction from successive portions thereof prior to re-accumulation of filtering material on such portions of said filtering means.

Also, in accordance with the invention a slurry may be filtered on a rotary filter having movably driven filtering means, by a method comprising the steps of causing filtering material to be normally continuously accumulated on successive portions of the movably driven filtering means, supplying material to be filtered onto the accumulated filtering material on the filtering means whereby such accumulated filtering material separates the supplied material into a fraction passing through the filtering material and a fraction collected thereby, and discharging the accumulated filtering material and its said collected fraction from successive portions of the filtering means prior to reaccumulating filtering material on such portions of the filtering means.

Referring to the drawings

FIG. 1 is a view schematically depicting a preferred embodiment of the apparatus of the invention;

FIG. 2 is an enlarged fragmentary view schematically depicting the whistle-type shower means included in such embodiment for supplying the material to be filtered;

FIG. 3 is another enlarged fragmentary view schematically depicting such whistle-type shower means;

FIG. 4 is a fragmentary view schematically illustrating a weir-type shower means which may be alternatively employed in place of the whistle-type shower means of FIGS. 1 through 3;

FIG. 5 is another fragmentary view schematically showing such weir-type shower means.

Referring more particularly to the drawings wherein similar reference characters designate corresponding parts throughout the several views, the filtering apparatus illustrated in FIG. 1 comprises a continuous rotary drum, travelling belt type, vacuum filter, designated generally as 10 and per se of conventional construction, which is disposed in a tank or vat 12. The vacuum filter 10 comprises a filter drum 14 located to be partially submerged in filtering material (such as, for example, diatomaceous earth) in the vat 12 and, throughout the operation of the filter 10, continuously rotatably driven in the clockwise direction schematically depicted by the arrow shown on the drum 14 in FIG. 1. The drum 14, in the conventional manner, includes circumferential drainage compartments communicating through the filter valve 16 with a vacuum pump or other suitable source of vacuum or subatmospheric pressure such that the subatmospheric pressure is applied to the drainage compartments throughout approximately the arcuate portion of the drum rotation between the 5 o' clock position and the 12 o' clock position, as viewed in FIG. 1. Further details of construction of filter drums suitable for use as the drum 14, if desired, can be obtained from U.S. Pat. application Ser. No. 204,103, filed Dec. 2, 1971, and assigned to the assignee of the present invention now U.S. Pat. No. 3,794,178, issued Feb. 26, 1974.

The filtering means of the filter 10 comprises a traveling, endless, porous filtering web or belt 18 which is entrained around the drum circumference and also around a roll 20 spaced from the drum 14. The filtering belt 18, as will be understood, is longitudinally driven in the clockwise direction (as viewed in FIG. 1) by the beforedescribed clockwise rotation of the drum 14; and, due to the beforedescribed subatmospheric pressure or vacuum applied to the drum drainage compartments, filtering material in the vat 12 is collected on successive portions of the filtering web 18 during the driven movement of the latter through the vat 12. A conventional doctor blade or knife 22 is positioned following the roll 20 for discharging material from the filtering belt 18 onto a discharge conveyor 24; and one or more washing showers 26 are provided intermediate the doctor blade 22 and the vat 12 in the direction of the driven movement of the filtering belt 18, for washing the belt 18 after the material discharge.

As shown in FIG. 1, the filtering apparatus further comprises a plurality of generally vertically elongated settling or decant, tanks or reservoirs 28 for causing a waste or other difficult-to-filter slurry (for example, a brewery waste slurry containing diatomaceous earth) to be separated into a plurality of components, the settled component of the slurry (for example, the settled diatomaceous earth component of the brewery waste) being employed as the filtering material. As will be readily appreciated, the number of the settling tanks 28 is not critical to the successive operation of the invention; and although two settling tanks are shown for the purposes of illustration in FIG. 1, the filtering apparatus could alternatively include only a single one, or more than two, of the tanks 28.

The upper end 30 of each settling tank 28 is open to serve as an inlet for introducing the waste or other slurry into the tank 28. The lower end of each settling tank 28 includes a conical, downwardly tapering portion 32 which its lower end is open to a settled material discharge chamber 34 formed integrally with the tank 28. The discharge chambers 34 are connected through settled material supply conduit means with the vat 12 to supply settled the material to the latter for use as filtering material on the filtering belt 18. Such settled material supply conduit means, as illustrated in FIG. 1, comprises individual supply conduits 36 connected to each chamber 34 and a manifold supply conduit containing a shut-off valve 40, connecting the conduits 36 with the vat inlet chamber 42 which in the usual manner communicates with the interior of the vat 12. The shut-off valve 40 is normally open during the operation of the apparatus to permit continuous flow of the settled material from the chambers 34 to the vat inlet chamber 42 whereby the vat 12 is normally maintained sufficiently filled with the settled material that operation of the filter will cause a covering of the settled material to be normally continuously accumulated on successive portions of the length of the filtering belt 18. As illustrated, a settled material recirculating conduit 44, having therein a recirculating pump 46 provided with shut-off valves 44a and 44b, may be connected to each conduit 36 for recirculating settled material from the conduit 36 back into the corresponding tank 28 at a location below the upper level 48 of the settled material in such tank 28. It will be understood, however, that the employment of the recirculating conduits 44 and pumps 46 is optional and not necessary to the successful operation of the invention.

The settling tanks 28 are further provided with second supply conduit means adapted for supplying the unsettled component or remainder of the contained slurry onto the settled component accumulated on the filtering belt 18, whereby such unsettled component is separated by the accumulated settled component into a fraction collected by the latter and another fraction passing through the settled component into the drum drainage compartments. This second supply conduit means is arranged to supply the unsettled component independently or separately of the beforedescribed supply conduits 36 and for each tank 28 comprises a plurality of supply conduits 50, 52, 54, 56, each containing a shut-off valve 58 permitting their alternative employment, which are individually connected to the tank 28 at different elevations intermediate the upper and lower ends of the tank 28, but above the upper level 48 of the settled material in the tank 28. As will be readily appreciated, the conduits 50, 52, 54, 56 for each tank 28 permit alternate supply of the unsettled component from different levels of the tank 28 and are intended for alternate employment dependent upon the level of the slurry contained in the corresponding tank 28. Such second supply means, in addition, comprises a manifold supply conduit 60 connected to the supply conduits 50, 52, 54, 56 of each tank 28, a manifold supply conduit 62 a communicating with the conduits 60 for both of the tanks 28 and containing a shut-off valve 64, and shower means designated generally as 66. As illustrated, a branch conduit 62a, containing a normally closed shut-off valve 62b, may communicate the manifold conduit 62 with the vat inlet chamber 42 for supplying a minor volume of the unsettled component to the vat inlet chamber 42 in the event that the settled component therein requires dilution.

As shown in FIGS. 1 through 3, the shower means 66 is of the whistle-type and arranged to supply the unsettled component or remainder of the slurry onto the filtering belt 18 (and its carried settled component of the slurry being employed as the filtering material) in the direction of the driven longitudinal movement of the filtering belt 18 and at least generally tangentially of the drum 14. More particularly, the shower means 66 of FIG. 1 through 3 comprises an elongated shower supply conduit 68, connected to the manifold conduit 62 to receive the unsettled component of the slurry therefrom, which longitudinally extends substantially the entire width of the filtering belt 18 and at intervals along its length carries depending shower discharge conduits 70 each terminating in a shower discharge opening 72. The shower discharge opening 72 of each shower conduit 70 communicates through the latter with the supply conduit 68; and the shower discharge openings 72, as beforedescribed, are arranged to discharge a whistle-type spray generally tangentially of the drum 14 and in the direction of the driven longitudinal movement of the filtering belt 18. As illustrated, the shower discharge conduits 70 are arranged relative to the drum 14 generally at the 10 o' clock position and at a location whereby subatmospheric pressure is applied internally of the drum drainage compartments at the location of the supply of the unsettled component of the slurry onto the filtering belt 18 overlying such compartments.

Alternatively, as shown in FIGS. 4 and 5, the shower means of the filtering apparatus could be of the weir-type and include one or more weirs 76 communicating with the manifold conduit 62 to receive the unsettled component of the slurry therefrom, and arranged to discharge such unsettled component over a weir or dam plate 78 onto the filtering belt 18. In any event, whichever method is employed for supplying the unsettled component onto the filtering means and its accumulated settled component, such supply is caused to occur at a location where the filterbelt 18 is overlying drum drainage components having subatmospheric pressure therein.

In the operation of the filtering apparatus of FIGS. 1 through 3, the settling tanks 28 are first filled to a desired level with difficult-to-filter slurry (such as, a brewery waste slurry of, for example, 3 to 5 percent solids consistency and containing diatomaceous earth, or another slurry containing a settleable first component suitable for use as a filtering material for a second component or the remainder of the slurry on the filtering belt 18). The valves 40, 58, 64, 62b, are, of course, all closed prior to such filling of the tanks 28, and all are maintained closed for a time period sufficient to permit settling of the diatomaceous earth (or other settleable component to be employed as the filtering material) to the bottoms of the tanks 28.

After such settling, the valve 40 is opened to permit the diatomaceous earth to flow from the tanks 28 to the vat 12 through the conduits 36 and the vat inlet chamber 42; and such flow of the diatomaceous earth is continued until the vat becomes sufficiently filled with the diatomaceous earth that operation of the filter 10 will cause the diatomaceous earth to be continuously accumulated on successive portions of the length of the longitudinally driven filtering belt 18. Then, operation of the filter 10 is begun to cause the subatmospheric pressure applied to the drainage compartments of the drum 10 to accrete a relatively thin covering (for example, a covering of from three-sixteenth inch to three-fourth inch) of the diatomaceous earth on the filtering belt 18, whereupon the appropriate ones of the valves 58 and the valve 64, are opened to commence the supply of the unsettled portion or remainder of the slurry onto the diatomaceous earth accumulated on the filtering belt 18. (As beforedescribed, the shower discharge openings 72 discharge such unsettled component of the slurry onto the filtering belt 18 in the direction of the driven longitudinal movement of the filtering belt 18 and at least generally tangentially of the drum 14. Also, as will be understood, the valve 40 is maintained open throughout the operation of the apparatus to maintain the vat 12 sufficiently filled with the diatomaceous earth that operation of the filter 10 causes the described covering of the diatomaceous earth to be normally continuously accumulated on successive portions of the length of the filtering belt 18.)

Resultantly, during the driven longitudinal movement of the filtering belt 18, the unsettled component of the slurry is continuously supplied through the discharge openings 72 onto successive portions of the length of the filtering belt 18. The layer or covering of diatomaceous earth accumulated on the filtering belt 18 separates the supplied unsettled component of the slurry into a fraction passing through such accumulated diatomaceous earth and the underlying filtering belt 18 into the drum drainage compartments and a second fraction which is collected and retained by such diatomaceous earth. The diatomaceous earth and its said collected fraction of the unsettled portion of the slurry are discharged from the filtering belt 18 onto the discharge conveyor 24 by the doctor blade 22, such discharged material being, for example, at a consistency in the range of from 25 to 35 percent solids; and, intermediate said discharge and re-entry into the vat 12, the filtering belt 18 is cleaned by washing liquid discharged by the showers 26, a cleaning impossible in the beforedescribed conventional apparatus employing a 4 to 6 inch layer of filtering material.

Hence, throughout the filter operation and until the supply of either diatomaceous earth or the unsettled component of the slurry is exhausted, (i) a new covering of diatomaceous earth is continuously accumulated on successive portions of the filtering belt 18, (ii) the unsettled component of the slurry is continuously discharged onto such successive portions and the thereon accumulated diatomaceous earth whereby the diatomaceous earth acts as a filtering material for such unsettled component, (iii) such diatomaceous earth on the filtering belt 18 and the fraction of the unsettled component retained thereby during the filtering, are discharged from such successive portions of the belt 18, and (iv) such portions of the belt 18 are then cleaned by the showers 26.

The operation of the FIGS. 4 and 5 embodiment of the filtering apparatus, and the practice of the method of the invention thereby, are believed to be apparent from the preceding description taken in connection with the accompanying drawings.

From the preceding description it will be seen that the invention provides not only new and improved filtering apparatus, but also new and improved filtering methods or processes. It will moreover be seen that such methods or processes are particularly suitable for filtering a slurry including a separable first component suitable for use as a filter material for a second component of the slurry on a rotary drum filter disposed in vat means and having endless filtering means longitudinally driven during the filter operation, and may comprise the steps of separating said first component from said second component of the slurry, sufficiently filling said vat means with said separated first component that operation of the filter will cause a covering thereof to be accumulated on said longitudinally driven filtering means, operating the filter to cause a covering of said separated first component to be so accumulated on said filtering means, thereafter filtering said second component by normally continuously supplying said second component, independently of said first component in said vat means, onto said accumulated first component on said filtering means while continuing to operate the filter whereby such accumulated first component separates said supplied second component into a fraction passing through such first component and a fraction collected thereby, discharging said accumulated first component and its said collected portion from said filtering means, and throughout said filtering of said second component normally maintaining said vat means sufficiently filled with said first component whereby said first component is normally continuously accumulated on said first means intermediate said discharge and said supplying of said second component.

It will be understood, however, that, although only two embodiments of the invention have been illustrated and specifically hereinbefore beforedescribed, the invention is not limited merely to these two embodiments, but rather contemplates other embodiments and variations within the scope of the following claims.

Having thus described my invention, I claim:

1. A method of filtering a brewery waste slurry including diatomaceous earth, comprising the steps of providing a rotary drum filter disposed in a vat and having an endless filtering web which is entrained around the drum of the filter to be longitudinally driven during the filter operation and also entrained around a roll spaced from such drum, separating the diatomaceous earth from an other component of the brewery waste slurry, sufficiently filling said vat with said separated diatomaceous earth that operation of the filter will cause a covering of the diatomaceous earth to be accumulated on said longitudinally driven filtering web, operating said filter to cause a covering of said diatomaceous earth to be so accumulated on said filtering web, thereafter filtering said other component of the brewery waste slurry by normally continuously supplying said other component, independently of said diatomaceous earth in said vat, onto said acccumulated diatomaceous earth on said filtering web at least generally tangentially of said drum and in the direction of the driven movement of said filtering web through whistle-type shower means while continuing to operate the filter whereby said accumulated diatomaceous earth separates said supplied other component of the brewery waste slurry into a fraction passing through said diatomaceous earth and a fraction collected thereby, discharging said accumulated diatomaceous earth and its collected fraction from said filtering web, and throughout said filtering of said other component of said brewery waste slurry normally maintaining said vat sufficiently filled with said diatomaceous earth whereby said diatomaceous earth is normally continuously accumulated on said filtering web intermediate said discharge and said supplying of said other component of the brewery waste slurry.

2. A brewery waste slurry filtering method according to claim 1, further comprising the step of cleaning said filtering web by washing liquid following said discharge of diatomaceous earth from said filtering web and prior to the accumulation of diatomaceous earth thereon.

3. A brewery waste slurry filtering method according to claim 1, wherein the diatomaceous earth is separated from said other component of the brewery waste slurry by settling in a settling tank, and said other component is alternatively dischargable from the settling tank at a plurality of different elevations.

4. A brewery waste slurry filtering method according to claim 2, wherein the waste slurry is of from 3 to 5 percent solids consistency, the diatomaceous earth is accumulated on said filtering web in a covering of from three-sixteenth inch to three-fourth inch, and the diatomaceous earth and its said collected fraction are discharged from the filtering web at a consistency in the range of from 25 to 35 percent solids.

5. Apparatus for filtering a brewery waste slurry, comprising a vat, a rotary drum filter disposed in said vat, said rotary drum filter including a filter drum located to be partially submerged in material in said vat and also including a roll spaced from said drum, said rotary drum filter further including an endless filtering web entrained around said drum and said roll to be longitudinally driven during the filter operation, at least one settling tank for containing a brewery waste slurry including diatomaceous earth and operable for separating such diatomaceous earth by settling from an other portion of the slurry, first conduit means connecting said settling tank with said vat for supplying the settled diatomaceous earth from said settling tank to said vat and for normally maintaining said vat sufficiently filled with the diatomaceous earth that operation of said rotary drum filter will cause a covering thereof to be normally continuously accumulated on successive portions of said filtering web, whistle-type shower means operatively associated with said filtering web for discharging material thereon at least generally tangentially of said filter drum and in the direction of the driven movement of said filtering web, second conduit means connecting said settling tank with said whistle-type shower means for supplying said other component of the brewery waste slurry to said shower means such that the latter supplies such component onto successive portions of said filtering means and to accumulated diatomaceous earth thereon independently of said vat, whereby such accumulated diatomaceous earth separates such supplied component into a fraction passing through the accumulated diatomaceous earth and a fraction collected thereby, said second conduit means further comprising a plurality of conduits connected to said settling tank for discharging said other component from different elevations, valve means for permitting alternative employment of said conduits, discharge means operatively associated with said filtering web for discharging accumulated diatomaceous earth and its said collected fraction from successive portions of said filtering web prior to re-accumulation of diatomaceous earth on such portions of said filtering web, and shower means operatively associated with said filtering web for cleaning said filtering web intermediate said discharge means and said re-accumulation of diatomaceous earth on said filtering web.

* * * * *